April 2, 1957     D. H. BELDEN     2,787,599
PROCESS FOR TREATING CATALYST PARTICLES
Filed May 3, 1952     2 Sheets-Sheet 1
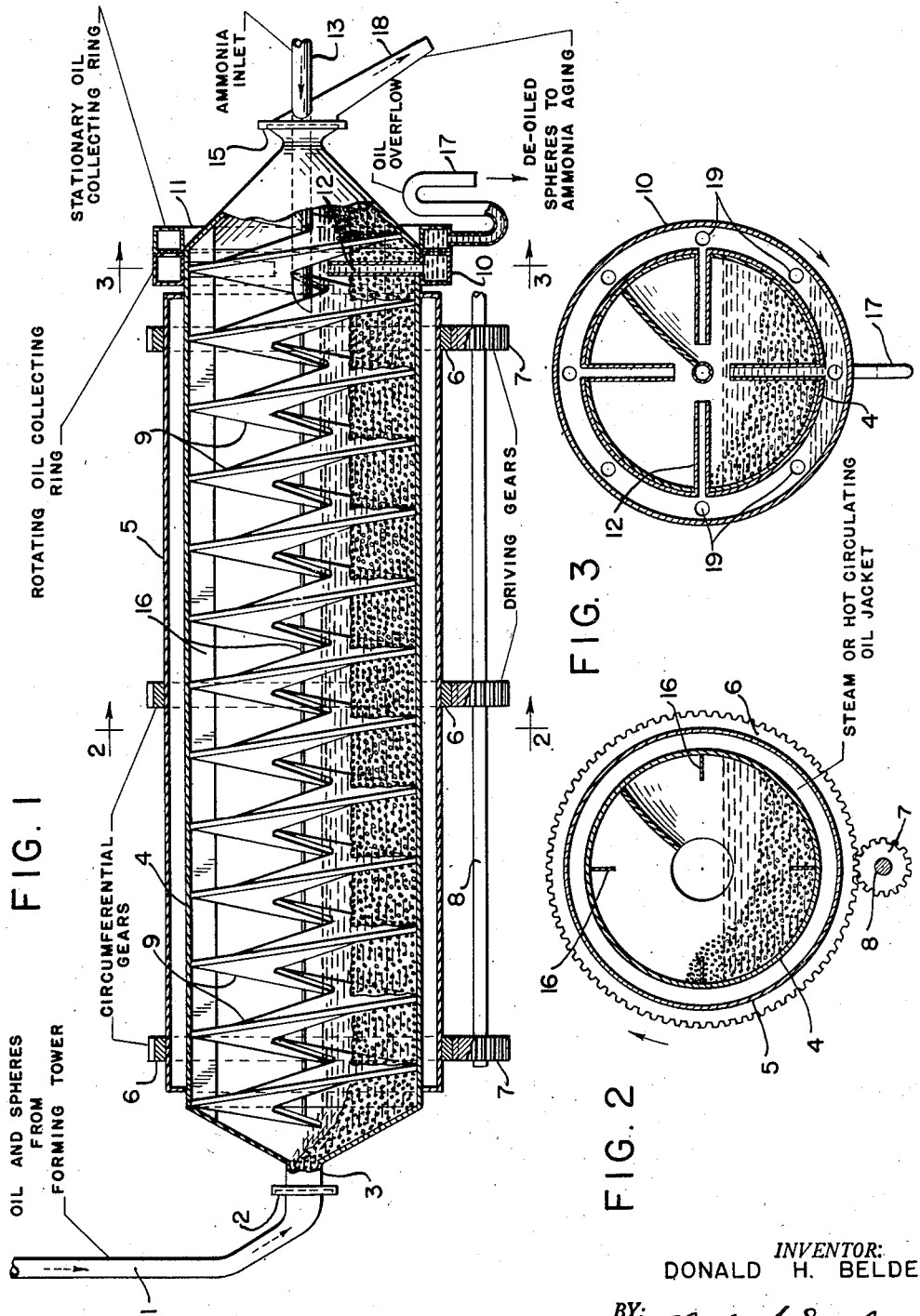
INVENTOR:
DONALD H. BELDEN
BY:
ATTORNEYS:

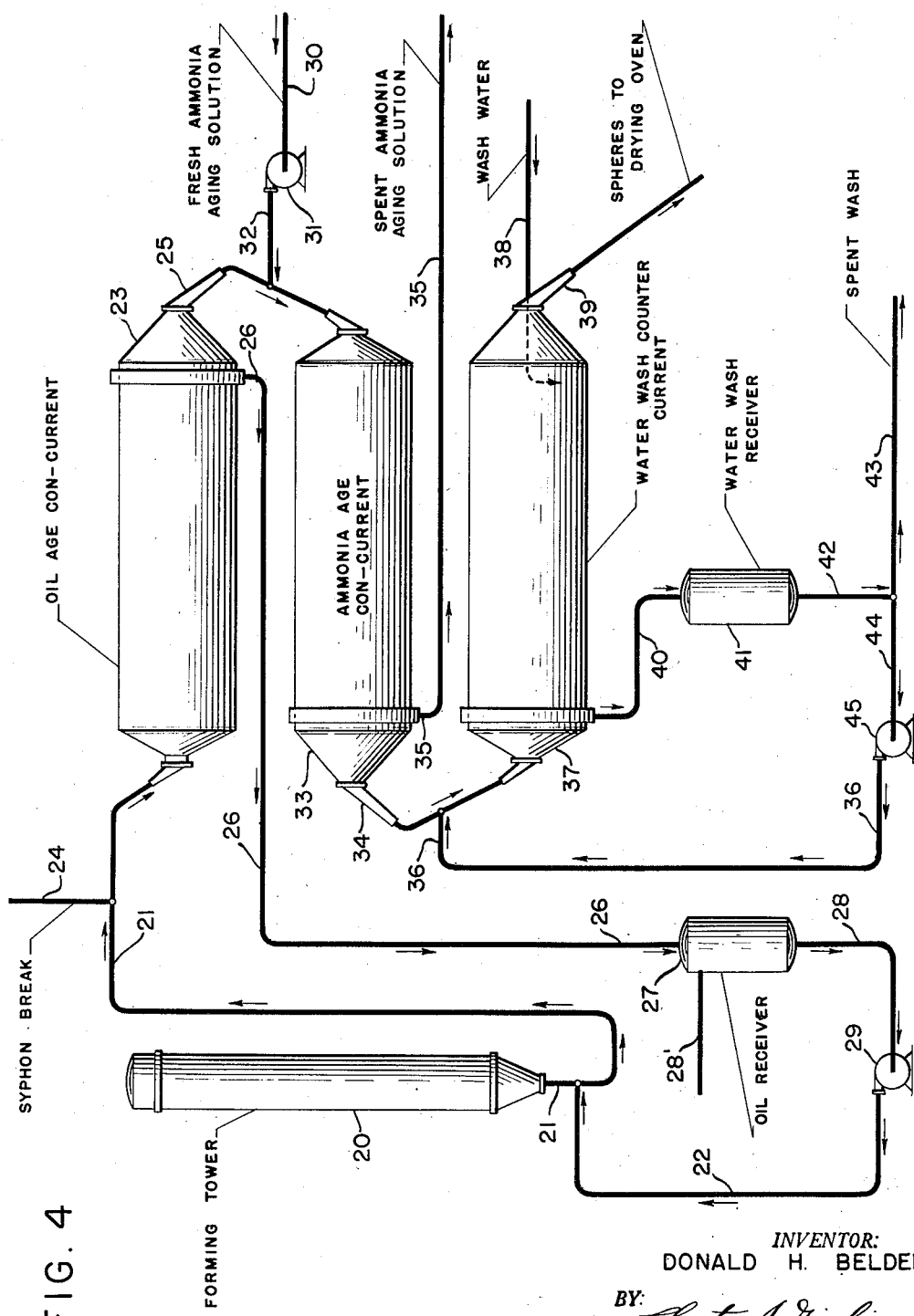

United States Patent Office 2,787,599
Patented Apr. 2, 1957

2,787,599
PROCESS FOR TREATING CATALYST PARTICLES

Donald H. Belden, North Riverside, Ill., assignor to Universal Oil Products Company, Chicago, Ill., a corporation of Delaware Application May 3, 1952, Serial No. 285,980

1 Claim. (Cl. 252—448)

This invention relates to a process and apparatus for treating catalyst particles. It is more specifically related to a process and apparatus for aging alumina gel spheres.

The manufacture of catalyst particles often requires extensive washing, treating, and/or aging steps. Most present day catalyst manufacturing is carried out in large batch equipment involving a considerable inventory of material, especially if the production rate is at all high. This contributes to a lot of manifolding of vessels which entails a rather high installation cost. One of the advantages of any system which permits continuous operation for steps which require considerable time such as those of aging or chemical treatment, is reduction of installation cost and floor space requirements. With reference to the manufacture of alumina gel spheres the aging and treating times ares necessarily long and the inventory of spheres within the treating vessels is quite large making it very difficult and at times impossible to secure thorough uniform treatment of the spheres. Also, because of the fragile nature of the material, schemes which might be suggested for use in such large batch tanks results in appreciable erosion of the product giving rise to high losses in the treating liquids. There thus is a definite need for a method of efficiently accomplishing this washing, treating, and/or aging of catalyst particles and one of the objects of my invention is to provide such an improved method.

Heretofore it has been considered that the steps of washing, treating and/or aging of catalyst particles be accomplished in continuous equipment of the belt conveyer type. However, if any belt type equipment is used, specifically for aging, the physical dimensions of the equipment become unreasonable. In the manufacture of catalysts it is also frequently desirable that no metal impurities be introduced into the catalyst and the mechanical development of a belt type conveyer system would have to take into consideration a large number of working parts operating within the aging liquors and since purity of catalyst is paramount in the majority of catalytic processes, the complications created by belt type systems would not give assurance that high standards of purity could be achieved and maintained.

An object of my invention is to provide an improved method and a means for contacting solids with a fluid stream in a substantially horizontal conduit or chamber, said method being accomplished so that said contacting is uniform and controllable. The value of the flexibility of this method is hereinafter shown where alumina spheres have to be aged and washed prior to further treatment.

In a broad embodiment the present invention relates to an improved method for effecting the continuous uniform contacting of solid particles with a fluid medium which comprises feeding said particles into a confined contacting zone, mildly agitating and tumbling said particles while passing them progressively in a substantially horizontal direction through said zone in a series of segregated batches of particles in contact with said fluid medium, and separately discharging contacted particles and fluid from said zone.

In one embodiment the present invention relates to an improved method for effecting the continuous uniform contacting and aging of gel particles with a fluid aging medium which comprises feeding said particles into a confined aging zone, mildly agitating and tumbling said gel particles while passing them progressively in a substantially horizontal direction through said zone in a series of segregated batches of particles in contact with said aging fluid and separately discharging contacted particles and fluid from said zone.

In a specific embodiment the present invention relates to an improved method for effecting the continuous uniform contacting and aging of gel particles with a fluid medium in a manner which comprises feeding said particles together with an aging fluid into a confined aging zone, mildly agitating and tumbling said particles while feeding them progressively in a substantially horizontal direction through said zone in a series of segregated batches of particles in contact with said aging fluid, passing a heat exchange medium in indirect heat exchange relationship with said aging zone and thereby maintaining a substantially constant temperature for each of said batches of particles moving through said zone, and separately discharging contacted particles and fluid from said aging zone.

One method of preparing the alumina spheres comprises continuously passing droplets of an alumina sol into an oil bath maintained at an elevated temperature and retaining the droplets in said oil bath until the droplets set to gel spheres, continuously withdrawing said spheres from said oil bath and immediately thereafter aging the spheres. The alumina spheres must be aged prior to being contacted with water and subsequently dried and calcined and this invention provides a method of properly and efficiently aging these spheres.

By the proper selection of aging conditions, spheres of different densities may be obtained. For example, if spheres of a density greater than about 0.7 are desired, these spheres being referred to herein as high density spheres, the alumina spheres are aged in a weak base at an elevated temperature for a period of at least 10 hours.

One object of my invention is to provide for a means of accurately controlling the aging variables of time and temperature.

When spheres of intermediate density are desired, the spheres having densities of about 0.5, the alumina spheres may be aged for at least 10 hours in oil, and then in ammonium hydroxide for at least 10 hours. The exact density of the spheres will depend upon the concentration and temperature of the ammonium hydroxide solution, higher densities being obtained with lower concentrations and with lower temperature. By using the process of my invention the concentration and temperature of ammonium hydroxide solution and the length of time that the spheres are in contact with this solution are very readily controllable.

When low density spheres are desired, that is, spheres having densities of about 0.5 or less the alumina spheres are aged in the suspending medium at an elevated temperature and then in ammonium hydroxide solution at an elevated temperature. Densities of the spheres are again determined by the concentration of the ammonium hydroxide solution and, therefore, higher density spheres are obtained when a less concentrated solution or a lower volume of solution is used. It is thus seen that the final physical characteristics of the alumina spheres are highly dependent upon the variables of time of contact, strength of solution, and temperature. My invention provides a process whereby each of these variables is readily and definitely controlled.

The equipment and process to be used will also permit treatment of the spherical particles with gases when such may be desired. This treatment can take place simultaneously with the treatment of the spheres with a liquid or it may take place as a separate step. In such a process provision would be made at one end portion of the treating apparatus so that the treating gas may be removed. The advantage of treating catalyst particles with a gas in this type of apparatus is that the spheres are constantly being tumbled through said gas and they are being continuously reoriented with respect to one another and with respect to the surface of the spheres in the treating zone.

The novelty and utility of the present invention is further described in the accompanying diagrams which illustrate a particular method of conducting the process which incorporates several specific embodiments of the invention. The illustration given is specifically concerned with the aging and washing of the catalyst spheres as was hereinbefore described, however, it is to be understood that the process is not to be unduly limited to the method of this illustration. For simplification, equipment such as valves, pumps, and similar appurtenances have been omitted. These are well known and are not essential to the understanding of the invention.

Figure 1 illustrates a cross sectional diagram of a treating chamber and the method of passing particles and treating liquid therethrough. Figure 2 illustrates a cross sectional view, as taken along line 2—2 of Figure 1. Figure 3 illustrates another cross sectional view, as taken along line 3—3 of Figure 1.

Referring to the drawings, oil and spheres from the forming tower are passed through inlet pipe 1, through rotary seal 2 and then into inlet pipe 3 whereby they are introduced into rotating cylindrical drum 4. In rotating cylindrical drum 4 there is fixed an open helix. As the drum rotates the particles and spheres from the forming tower are moved from one end of the drum to the other. Means for the rotation are shown in this diagram as circumferential gears 6, driving gears 7 and power shaft 8. In this particular illustration gears are used, however, it is to be understood that any conventional means of rotating the kiln can be used within the scope of this invention. For example, it would also be feasible to accomplish the rotation of the kiln by means of pulley belts or friction wheels.

It is a particular feature of the drum herein illustrated to have a steam or hot circulating oil jacket which maintains an even temperature throughout the kiln. In the aging process as has hereinbefore been described, it is desirable when preparing an alumina sphere with approximately 0.5 density to maintain the treating liquors at a temperature above 125° F. and to treat the alumina spheres at this temperature for approximately 10 hours. It is thus desirable to provide some means of controlling this temperature, and this is accomplished as shown in this illustration by the steam or hot oil circulating jacket. In other modifications, not illustrated, it may be desirable to cool the kiln and in this case a cooling medium could be used in the jacket. If high temperatures are desired it would be feasible to apply heat directly to the jacket, as by an open flame, or by use of suitable high boiling fluid in place of steam such as Dowtherm. As the solid particles with the liquid medium are passed through the elongated horizontally disposed cylindrical chamber or kiln they are mildly agitated and tumbled by lifting flights 16 (Fig. II). As best shown in Figure 2, these lifting flights are spaced periodically around the inside circumferential and throughout the entire length of the rotating kiln, the purpose of the flights being to give complete uniformity of contact of the spheres with the liquid. The vessel is turned over at a very slow rate of speed so that the spheres stay within the lower portion of the treating chamber and the horizontal motion combined with the mixing effect caused by the lifting flights will continuously reorient the spheres relative to one another, permitting even treatment. The agitation, however, is very mild with the spheres rolling over one another without appreciable rubbing against the metal surfaces of the vessel. The helix 9 which is fixed within the kiln 4 is shown as an open helix and, therefore, the aging liquid will continuously overflow from one of the small batches of spheres to the next and finally will leave the kiln through overflow pipe 12. Screened "windows" can also be inserted in the surface of the helix to permit a flow of liquid in lower portions of the bed from one group of segregated spheres to the next. In the case here illustrated four oil overflow pipes are spaced along the circumferences of rotating oil collector ring 10. By this provision the level of the treating liquid is essentially that shown in Figures 2 and 3. In Figure 3, four oil overflow pipes are shown, however, the number provided in any apparatus is not necessarily fixed to this number. As the kiln rotates in the direction shown in Figure 3, the oil will flow down each of the overflow pipes as each end is brought into a position which is below the level of the liquid in the kiln. Adjacent to rotating oil collector ring 10 is stationary oil collector ring 11. This stationary oil collector ring is joined to the rotating oil collector ring by a suitable rotary seal. The stationary oil collector ring, however, is provided with a hole only at the lower position so that oil may be withdrawn from the rotating oil collector ring. The oil in the stationary oil collector ring is withdrawn through oil overflow pipe 17. In this particular apparatus ammonia inlet 13 is provided so that an ammonia solution may be introduced at a point within the kiln and will aid in the deoiling of the catalyst spheres before further treatment of said spheres. The ammonia solution introduced into ammonia pipe inlet 13, passes through rotary seals 14 and 15 before discharge into the rotating kiln. Thus the catalyst spheres after satisfactory contact with the aging oil are substantially deoiled at the outlet end of the kiln and are continuously withdrawn from said kiln through outlet pipe 18. Figure 2 clearly illustrates the lifting flights and their ability to mildly agitate and tumble the catalyst spheres. Also shown in this figure are probable levels of the spheres and liquid, and a cross section of the steam or hot oil circulating jacket 5. Cross section 3—3 of Figure 3 was taken directly through the rotating oil collector ring and shows four oil overflow pipes 12, but as hereinbefore was mentioned the number of overflow pipes is not necessarily limited to four. The holes 19 shown are the drains to the stationary oil collector ring. It may also be desirable, at times, to effect the oil aging and ammonia aging simultaneously and in such a process ammonia gas could be introduced through ammonia inlet line 13 and provision would be made at the opposite end for removing the ammonia gas.

A particular method of conducting the process as adapted to the oil aging, ammonia aging, and water washing of spherical alumina catalyst particles is illustrated in Figure 4. The oil aging zone and the water washing zone each utilize equipment similar to that described hereinbefore and as illustrated in Figures 1, 2, and 3. The alumina spheres in forming tower 20 are withdrawn through line 21 and are joined with oil stream 22 and introduced into oil aging zone 23. Oil aging zone 23 is a rotating drum as illustrated in Figures 1, 2, and 3 in which the alumina spheres and oil solution are passed in a concurrent manner through said zone. No steam or hot circulating oil jacket is illustrated, however, it is to be understood that these can be utilized within the scope of this invention. Syphon break 24 is provided in line 21 to prevent the draining of liquid from tower 20. The alumina spheres after being mildly agitated and tumbled within said aging zone while in contact with the aging oil are passed from the aging oil near the outlet end of the aging zone and are withdrawn through line 25. The oil from the aging zone is withdrawn through line 26 and is directed into oil receiver 27. Receiver 27 is provided with inlet line 28 whereby makeup oil may be introduced into the receiver. The oil in receiver 27 is withdrawn through line 28 is picked up by pump 29 and is directed into line 22. Fresh ammonia aging solution is directed through line 30 is picked up by pump 31 and directed into line 32 and is joined by the alumina spheres in line 25 and is directed into ammonia aging zone 33. Ammonia aging zone 33 is herein illustrated as being a concurrent process, however, if it is desirable the aging may be contacted in a countercurrent method within the scope of this invention. After the alumina particles are mildly agitated and tumbled while being progressively passed through said ammonia aging zone while in contact with the ammonia aging solution they are substantially separated from said ammonia aging zone and withdrawn through line 34. The ammonia aging solution is withdrawn from said ammonia aging zone through line 35.

The alumina spheres in line 34 are joined with spent water wash solution in line 36 and introduced into water washing zone 37. Fresh wash water is introduced through line 38 into water washing zone 37. The water wash herein illustrated essentially is countercurrent. The amount of water being introduced into said zone through line 36 being but a minor part of the fresh water wash being introduced into said zone. After the alumina spheres are mildly agitated and tumbled while passing them progressively and in a substantially horizontal direction through said water washing zone in a series of segregated batches of particles, they are separately withdrawn from said zone through line 39 for further treatment. This further treatment usually is a drying operation or a calcining operation. The water wash in zone 37 is withdrawn through line 40 and directed into water wash receiver 41. The water in receiver 41 is withdrawn through line 42 and is split into a major stream 43 which is directed to the sewer or to a purification system and a minor amount of the water in line 44 is picked up by pump 45 and discharged into line 36. The small water stream in line 36 is provided to facilitate the introduction of the alumina spheres into the water washing zone after being withdrawn from the ammonia aging zone. The foregoing illustration was to show a particular apparatus and a particular utilization of the apparatus of the herein disclosed process. Many other illustrations differing in minor details but within the scope of this invention can be cited. Hence, the invention should not be restricted except by the terms or spirit of the claim.

I claim as my invention:

An improved method for effecting the continuous uniform aging and washing of alumina gel spheres which comprises withdrawing said spheres from a forming tower, passing said spheres into a confined oil aging zone, mildly agitating and tumbling said spheres while feeding them progressively and longitudinally through said zone in a series of relatively small batches of spheres in contact with said oil aging fluid and separately discharging the contacted spheres and fluid from said zone, introducing said spheres along with fresh ammonia aging solution into a confined ammonia aging zone, mildly agitating and tumbling said spheres while feeding them progressively and longitudinally through said ammonia aging zone in a series of relatively small batches of spheres in contact with said ammonia aging solution and separately discharging the contacted spheres and ammonia aging solution from said zone, introducing said spheres into a confined water washing zone, mildly agitating and tumbling said spheres while feeding them progressively and longitudinally through said zones in a series of relatively small batches of spheres in contact with water passing countercurrently to the direction of said spheres, and separately discharging contacted spheres and liquid from said water washing zone.

References Cited in the file of this patent

UNITED STATES PATENTS

| | | |
|---|---|---|
| 889,159 | Trump | May 26, 1908 |
| 1,406,525 | Bouillon | Feb. 14, 1922 |
| 2,314,871 | DeBack | Mar. 30, 1943 |
| 2,337,137 | Thompson et al. | Dec. 21, 1943 |
| 2,433,552 | Haney et al. | Dec. 30, 1947 |
| 2,550,948 | Tusson | May 1, 1951 |
| 2,568,352 | Milligan | Sept. 18, 1951 |
| 2,584,286 | Pierce et al. | Feb. 5, 1952 |
| 2,620,314 | Hoekstra | Dec. 2, 1952 |

FOREIGN PATENTS

| | | |
|---|---|---|
| 372,684 | Germany | Mar. 31, 1923 |
| 603,729 | Great Britain | June 22, 1948 |